United States Patent
Okada (10) Patent No.: US 6,796,787 B2
(45) Date of Patent: Sep. 28, 2004

(54) PRODUCT EJECTING APPARATUS AND METHOD FOR AN INJECTION MOLDING MACHINE

(75) Inventor: Norihito Okada, Chiba (JP)

(73) Assignee: Sumitomo Heavy Industries, Ltd., Tokyo (JP)

(*) Notice: Subject to any disclaimer, the term of this patent is extended or adjusted under 35 U.S.C. 154(b) by 172 days.

(21) Appl. No.: 09/805,904

(22) Filed: Mar. 15, 2001

(65) Prior Publication Data

US 2001/0026032 A1 Oct. 4, 2001

(30) Foreign Application Priority Data

Mar. 21, 2000 (JP) .................................... 2000-077998

(51) Int. Cl.⁷ .............................................. B29C 45/40
(52) U.S. Cl. ...................... 425/554; 425/139; 425/556
(58) Field of Search ............................... 425/139, 553, 425/554, 556, 810; 264/106, 107, 334

(56) References Cited

U.S. PATENT DOCUMENTS

| | | | |
|---|---|---|---|
| 4,891,002 A | 1/1990 | Inaba et al. | 425/556 |
| 5,180,595 A * | 1/1993 | Kinoshita | 425/556 |
| 5,196,213 A * | 3/1993 | Watanabe et al. | 425/556 |
| 5,253,997 A | 10/1993 | Kamada | 425/556 |
| 5,460,509 A * | 10/1995 | Sawafuji et al. | 425/556 |
| 5,492,658 A | 2/1996 | Ohno et al. | 264/40.1 |
| 5,545,365 A * | 8/1996 | Asai | 264/328.7 |
| 5,585,126 A * | 12/1996 | Heindl et al. | 425/589 |
| 5,599,486 A * | 2/1997 | Fujishiro et al. | 264/40.1 |
| 5,639,486 A * | 6/1997 | Yamaguchi | 425/139 |
| 5,648,105 A * | 7/1997 | Shimazu et al. | 425/139 |
| 6,109,904 A * | 8/2000 | Hehl | 425/190 |
| 6,264,459 B1 * | 7/2001 | Voets | 425/548 |

FOREIGN PATENT DOCUMENTS

| | | |
|---|---|---|
| EP | 0 361 406 A2 | 4/1990 |
| EP | 0 591 983 A1 | 4/1994 |
| EP | 0 890 426 A2 | 1/1999 |
| JP | 02-249617 | 10/1990 |
| JP | 09-174622 | 7/1997 |
| JP | 11-019995 | 1/1999 |

* cited by examiner

Primary Examiner—W. L. Walker
Assistant Examiner—Emmanuel S. Luk
(74) Attorney, Agent, or Firm—Squire, Sanders & Dempsey L.L.P.

(57) ABSTRACT

A product ejecting apparatus for an injection molding machine includes: a first drive unit; a first transmission unit connected to the first drive unit, wherein a rotation of the first drive unit results in a rotation of the first transmission unit; a second drive unit; a second transmission unit connected to the second drive unit, wherein a rotation of the second drive unit causes a rotation of the second transmission unit; an ejector pin configured to reciprocate based upon a motion of the first transmission unit; and a working member connected to the second transmission unit, wherein a movement of the second transmission unit results in reciprocating movement of the working member. The first drive unit is operated so as to cause the first transmission member to reciprocate, thereby causing the ejector pin to reciprocate. The second drive unit is operated so as to cause the second transmission member to reciprocate, thereby causing the working member to reciprocate.

22 Claims, 5 Drawing Sheets

PRODUCT EJECTING APPARATUS AND METHOD FOR AN INJECTION MOLDING MACHINE

BACKGROUND OF THE INVENTION

1. Field of the Invention

The present invention relates to a product ejecting apparatus and method for an injection molding machine.

2. Description of the Related Art

Conventionally, for example, a disc-molding machine is adapted to mold a disc by the steps of heating and melting within a heating cylinder a resin serving as a molding material; charging the molten resin into a cavity of a disc-making mold assembly serving as a mold apparatus; and allowing to set through cooling.

Figure 1:
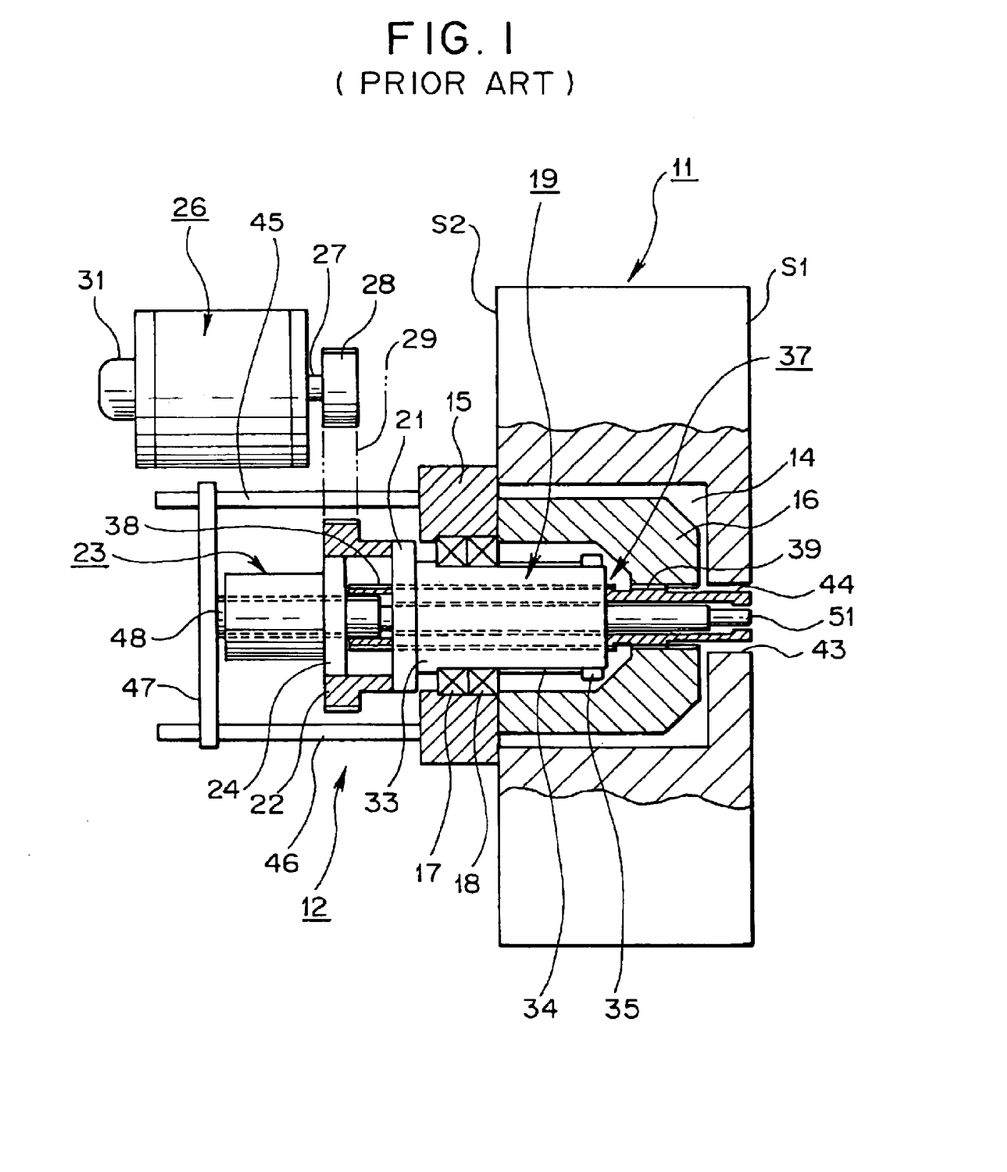
FIG. 1 is a sectional view showing a main portion of a conventional injection molding machine.
Figure 2:
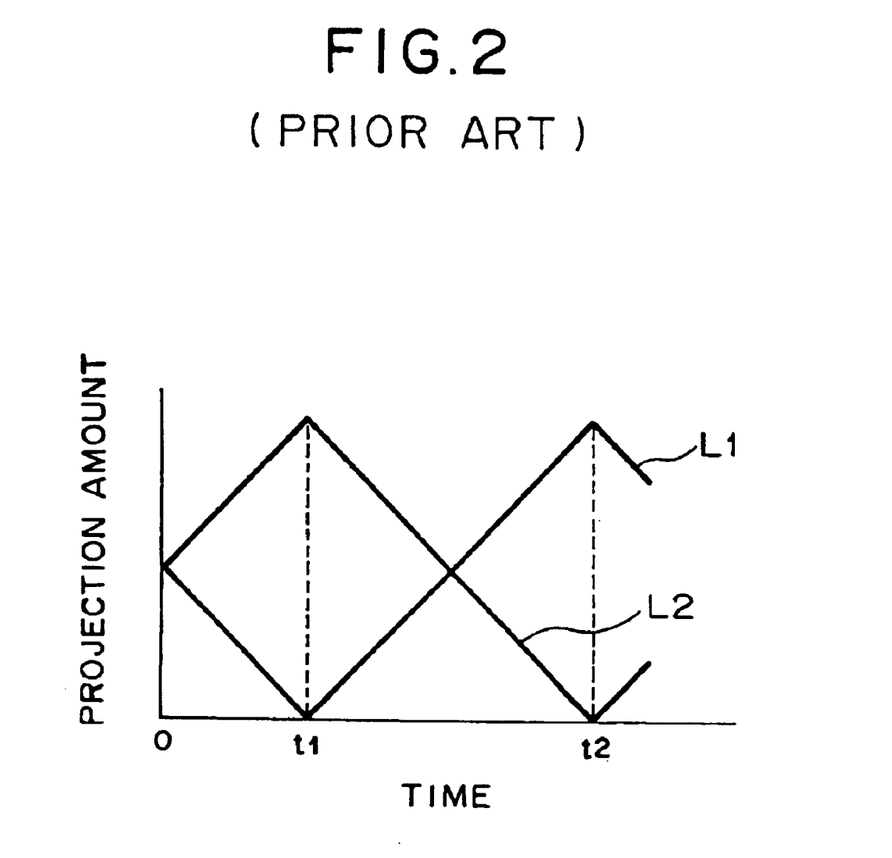
FIG. 2 is a diagram showing operation of a conventional cut punch/ejector unit.

FIG. 1 is a sectional view showing a main portion of a conventional injection molding machine. FIG. 2 is a diagram showing operation of a conventional cut punch/ejector unit. In FIG. 2, the x-axis represents time, and the y-axis represents projection amount.

In FIG. 1, reference numeral 11 denotes a movable platen. An unillustrated movable mold unit is attached to a front end face (right-hand end face in FIG. 1) S1 of the movable platen 11. A cut punch/ejector unit 12 is attached to a rear end face (left-hand end face in FIG. 1) S2 of the movable platen 11. The movable mold unit includes a base plate and a mirror-finished block attached to the base plate.

An unillustrated stationary platen is disposed in front (right-hand side in FIG. 1) of the movable platen 11. An unillustrated stationary mold unit is attached to the stationary platen in such a manner as to face the movable mold unit. The stationary mold unit includes a base plate, a mirror-finished block attached to the base plate, and a stamper attached to the mirror-finished block.

An unillustrated mold-clamping unit is disposed in the rear (left-hand side in FIG. 1) of the movable platen 11. The mold-clamping unit is adapted to advance/retreat (move rightward/leftward in FIG. 1) the movable platen 11, thereby closing, clamping, or opening the disc-making mold assembly.

A disc is formed in the following manner. First, the mold-clamping unit is operated so as to advance (move rightward in FIG. 1) the movable platen 11, thereby closing the mold. Subsequently, the mold-clamping unit is operated further to generate a mold-clamping force for clamping the mold. At this time, the mirror-finished block of the movable mold unit and that of the stationary mold unit define a cavity therebetween. Then, molten resin is injected through the injection nozzle of an unillustrated injection unit so as to fill the cavity, followed by cooling to form a disc blank. After the resin is completely cooled and before the resin sets, the cut punch/ejector unit 12 is operated so as to punch a hole in the disc blank, thereby forming a disc. Subsequently, the mold-clamping unit is operated so as to retreat (move leftward in FIG. 1) the movable platen 11, thereby opening the mold. Also, the cut punch/ejector unit 12 is operated so as to advance an unillustrated ejector pin, thereby knocking out the disc from the mirror-finished block of the movable mold unit; i.e., releasing the disc from the mold.

Next, the cut punch/ejector unit 12 will be described.

A housing accommodation hole 14 is formed in the movable platen 11 in such a manner as to open at the rear end face S2. An annular bearing housing 15 is attached to the rear end face S2 so as to cover the housing accommodation hole 14. A closed-bottomed cylindrical housing 16 is attached to the front end (right-hand end in FIG. 1) of the bearing housing 15 while being accommodated within the housing accommodation hole 14. Two bearings 17 and 18 are disposed within the bearing housing 15. A first ball nut 19 is rotatably supported by the bearings 17 and 18. The first ball nut 19 has a flange portion 21 at the rear end (left-hand end in FIG. 1) thereof. An annular driven pulley 22 is fixedly attached to the flange portion 21. A second ball nut 23 is attached to the pulley 22. The second ball nut 23 has a flange portion 24 at the front end thereof. The flange portion 24 is fixedly fitted into the pulley 22.

A servomotor 26 serving as drive means is disposed. A timing belt 29 is looped around and extends between the driven pulley 22 and a drive pulley 28 attached to an output shaft 27 of the servomotor 26. The pulleys 22 and 28 and the timing belt 29 constitute rotation transmission means. Reference numeral 31 denotes an encoder serving as a rotational-speed detector for detecting the rotational speed of the servomotor 26.

The first ball nut 19 has a stepped portion 33 adjacent to the rear end of the bearing 17, while a cylindrical positioning ring 34 is disposed on the outer circumferential surface of the first ball nut 19 adjacent to the front end of the bearing 18. The front end of the first ball nut 19 and a positioning nut 35 are screw-engaged. The positioning nut 35 is tightened so as to hold the bearings 17 and 18 by means of the stepped portion 33 and the positioning ring 34, thereby positioning the first ball nut 19 with respect to the bearing housing 15.

A hole 43 is formed in the movable platen 11 in such a manner as to extend therethrough. A cylindrical cut punch unit 37 is disposed within the hole 43, the first ball nut 19, and the bearing housing 15 such that it can reciprocate. The cut punch unit 37 includes, from the rear end to the front end, a ball screw portion 38 having, for example, right-hand threads formed on the outer circumferential surface thereof, a spline portion 39 having a spline formed on the outer circumferential surface thereof, and a cut punch rod 44. Right-hand threads are formed on the inner wall surface of the first ball nut 19 so as to establish screw engagement between the first ball nut 19 and the ball screw portion 38. A spline is formed on the housing 16 so as to establish spline engagement between the housing 16 and the spline portion 39. A cylindrical cut punch serving as a working member is disposed within the movable mold unit. The rear end of the cut punch is connected to the front end of the cut punch rod 44. The first ball nut 19 and the ball screw portion 38 constitute motion conversion means for converting rotary motion of the first ball nut 19 to linear motion of the ball screw portion 38. The spline portion 39 constitutes rotation restriction means for restricting rotation of the cut punch unit 37.

Two guide bars 45 and 46 are attached to the rear end face of the bearing housing 15 in such a manner as to extend rearward. A plate 47 is disposed on the guide bars 45 and 46 such that it can reciprocate along the same. A ball screw 48 is attached to the plate 47 in such a manner as to extend forward. Inverse threads with respect to the threads formed on the outer circumferential surface of the ball screw portion 38; for example, left-hand threads, are formed on the outer circumferential surface of the ball screw 48. For example, left-hand threads are formed on the inner wall surface of the second ball nut 23 so as to establish screw engagement between the second ball nut 23 and the ball screw 48. An ejector rod 51 is formed at the front end of the ball screw 48 in such a manner as to extend forward through the cut punch unit 37. An ejector pin is disposed within the cut punch. The rear end of the ejector pin is connected to the front end of the ejector rod 51. The second ball nut 23 and the ball screw 48 constitute motion conversion means for converting rotary motion of the second ball nut 23 to linear motion of the ball screw 48. The plate 47 constitutes rotation restriction means for restricting rotation of the ball screw 48.

Next, operation of the thus-configured cut punch/ejector unit 12 will be described.

First, drive control means of an unillustrated controller causes the servomotor 26 to rotate in the regular direction. Rotation in the regular direction is transmitted to the first and second ball nuts 19 and 23 via the output shaft 27, the pulley 28, the timing belt 29, and the pulley 22. Accordingly, the cut punch unit 37 is caused to advance, thereby causing the cut punch to advance, as represented by line L2 in FIG. 2. Thus, the cut punch punches a hole in the disc blank. At this time, the ball screw 48 is caused to retreat, thereby causing the ejector pin to retreat, as represented by line L1 in FIG. 2.

At timing t1, the drive control means causes the servomotor 26 to stop rotating and resume rotation in the reverse direction. Rotation in the reverse direction is transmitted to the first and second ball nuts 19 and 23 via the pulley 28, the timing belt 29, and the pulley 22. Accordingly, the cut punch unit 37 is caused to retreat, thereby causing the cut punch to retreat, as represented by line L2. Thus, the cut punch comes off the punched hole. At this time, the ball screw 48 is caused to advance, thereby causing the ejector pin to advance, as represented by line L1. Thus, the ejector pin knocks out the disc from the mold. Subsequently, when timing t2 is reached, the drive control means causes the servo motor 26 to stop rotating.

Through use of the servomotor 26 for punching a hole in the disc blank, positional accuracy of the cut punch can be improved.

However, according to this conventional disc-making mold assembly, when the ejector pin projects so as to knock out the disc from the mold, the cut punch is caused to retreat. Thus, the cut punch fails to hold the disc. In other words, the cut punch and the ejector pin cannot be operated concurrently.

Therefore, in order to hold the disc for a predetermined period of time by means of the cut punch, knock-out operation of the ejector pin must be delayed accordingly, causing an increase in molding cycle time.

SUMMARY OF THE INVENTION

An object of the present invention is to solve the above-mentioned problems in the conventional disc-making mold assembly and to provide a product ejecting apparatus and method for an injection molding machine which apparatus and method allow a working member and an ejector pin to operate concurrently to thereby shorten molding cycle time.

To achieve the above object, the present invention provides a product ejecting apparatus for an injection molding machine, comprising: a first drive unit; a first transmission unit connected to the first drive unit, wherein a rotation of the first drive unit results in a rotation of the first transmission unit; a second drive unit; a second transmission unit connected to the second drive unit, wherein a rotation of the second drive unit causes a rotation of the second transmission unit; an ejector pin configured to reciprocate based upon a motion of the first transmission unit; and a working member connected to the second transmission unit, wherein a movement of the second transmission unit results in reciprocating movement of the working member.

Through operation of the first drive means, the first transmission member is caused to reciprocate, thereby causing the ejector pin to reciprocate. Through operation of the second drive means, the second transmission member is caused to reciprocate, thereby causing the working member to reciprocate.

Accordingly, when the ejector pin is caused to project in order to knock out a molded product from the mold, the working member can remain at the advance position of its stroke to thereby hold the molded product. In other words, the working member and the ejector pin can be operated concurrently.

Thus, there is no need for delaying knock-out operation of the ejector pin in order to hold a molded product by means of the working member, thereby shortening molding cycle time.

BRIEF DESCRIPTION OF DRAWINGS

The structure and features of the product ejecting apparatus and method for an injection molding machine according to the present invention will be readily appreciated as the same becomes better understood by referring to the drawings, in which.

DESCRIPTION OF PREFERRED EMBODIMENTS

Embodiments of the present invention will next be described with reference to the drawings.

Figure 3:
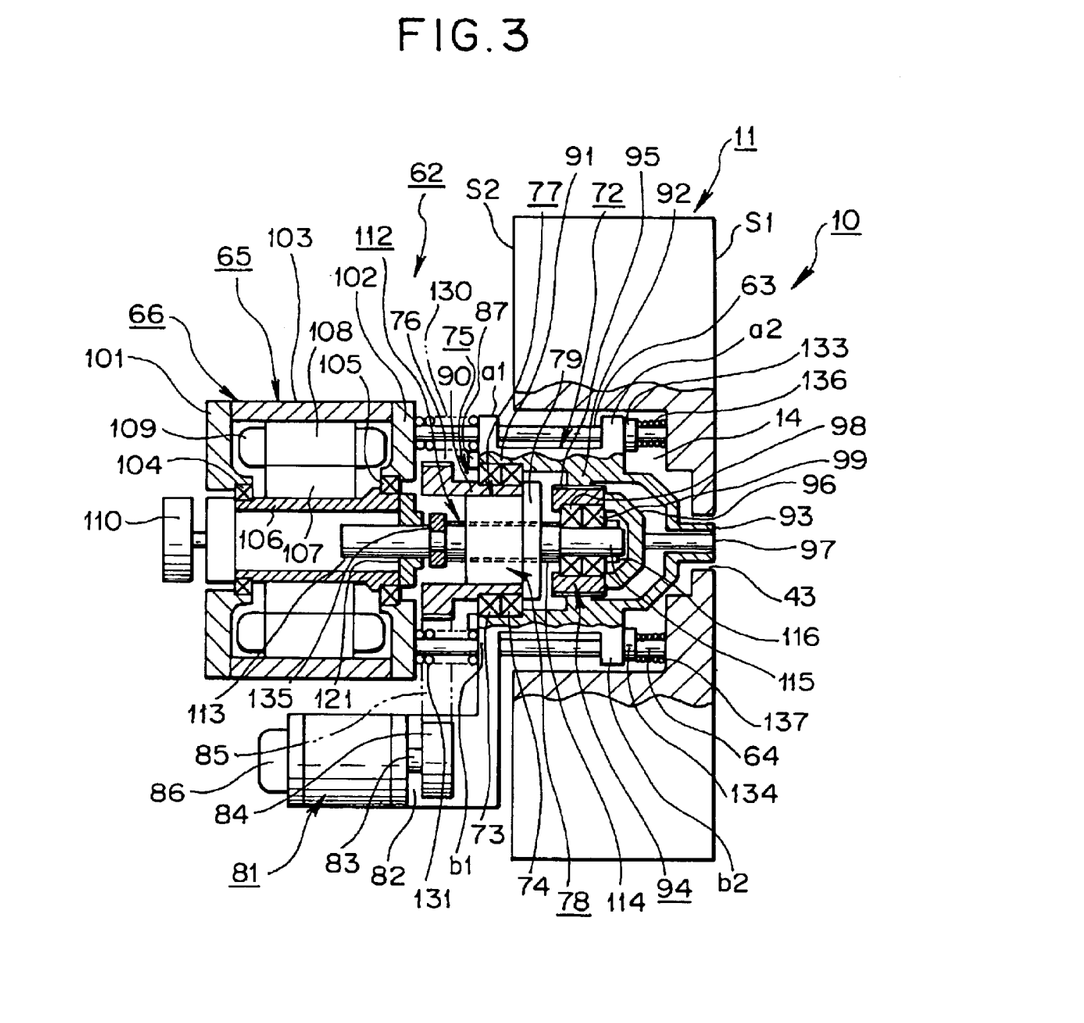
FIG. 3 is a sectional view showing a main portion of an injection molding machine according to a first embodiment of the present invention.
Figure 4:
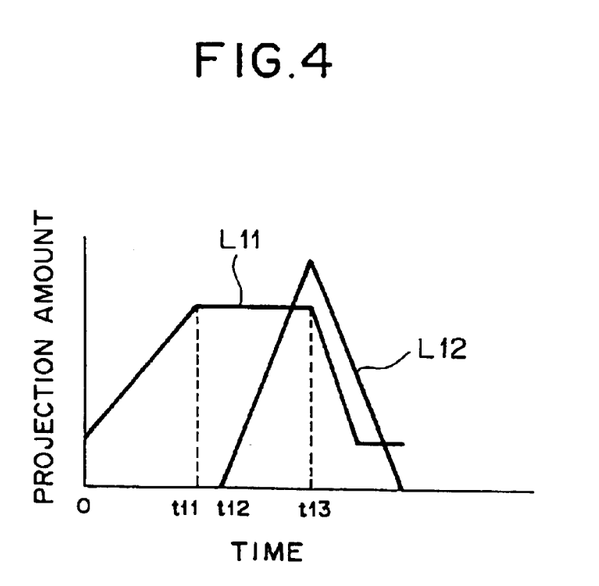
FIG. 4 is a diagram showing operation of a cut punch/ejector unit of the first embodiment.

FIG. 3 is a sectional view showing a main portion of an injection molding machine according to a first embodiment of the present invention. FIG. 4 is a diagram showing operation of a cut punch/ejector unit of the first embodiment. In FIG. 4, the x-axis represents time, and the y-axis represents the projection amount.

In FIG. 3, reference numeral 10 denotes a disc-making mold assembly serving as a mold apparatus, and reference numeral 11 denotes a movable platen. An unillustrated movable mold unit is attached to a front end face (right-hand end face in FIG. 3) S1 of the movable platen 11. A cut punch/ejector unit 62 is attached to a rear end face (left-hand end face in FIG. 3) S2 of the movable platen 11. The movable mold unit includes a base plate and a mirror-finished block attached to the base plate.

An unillustrated stationary platen is disposed in front (right-hand side in FIG. 3) of the movable platen 11. An unillustrated stationary mold unit is attached to the stationary platen in such a manner as to face the movable mold unit. The stationary mold unit includes a base plate, a mirror-finished block attached to the base plate, and a stamper attached to the mirror-finished block.

An unillustrated mold-clamping unit is disposed in the rear (left-hand side in FIG. 3) of the movable platen 11. The mold-clamping unit is adapted to advance/retreat (move rightward/leftward in FIG. 3) the movable platen 11, thereby closing, clamping, or opening the disc-making mold assembly.

A disc serving as a molded product is formed in the following manner. First, the mold-clamping unit is operated so as to advance (move rightward in FIG. 3) the movable platen 11, thereby closing the mold. Subsequently, the mold-clamping unit is operated further to generate a mold-clamping force for clamping the mold. At this time, the mirror-finished block of the movable mold unit and that of the stationary mold unit define a cavity therebetween. Then, molten resin serving as molding material is injected through the injection nozzle of an unillustrated injection unit so as to fill the cavity, followed by cooling to form a disc blank. After the resin is completely cooled and before the resin sets, the cut punch/ejector unit 62 is operated so as to punch a hole in the disc blank, thereby forming a disc. Subsequently, the mold-clamping unit is operated so as to retreat (move leftward in FIG. 3) the movable platen 11, thereby opening the mold. Also, the cut punch/ejector unit 62 is operated so as to advance an unillustrated ejector pin, thereby knocking out the disc from the mirror-finished block of the movable mold unit; i.e., releasing the disc from the mold.

Next, the cut punch/ejector unit 62 will be described.

A housing accommodation hole 14 is formed in the movable platen 11 in such a manner as to open at the rear end face S2. Within the housing accommodation hole 14, a plurality of guide bars (two guide bars 63 and 64 in the present embodiment) extend rearward from the movable platen 11. A servomotor 65, serving as first drive means, for driving an ejector is attached to the rear ends (left-hand ends in FIG. 3) of the guide bars 63 and 64. When the servomotor 65 is operated, a ball screw shaft unit 112 serving as a first transmission member is caused to rotate.

The servomotor 65 includes a motor case 66 formed of annular plates 101 and 102 and a cylindrical frame 103 disposed between the annular plates 101 and 102; bearings 104 and 105 fitted into the annular plates 101 and 102; a hollow output shaft 106 supported rotatably by the bearings 104 and 105; a rotor 107 mounted on the output shaft 106; a stator 108 located radially outside the rotor 107 and attached to the frame 103; and a stator coil 109 wound on the stator 108. Reference numeral 110 denotes a first encoder serving as a rotational-speed detector for detecting the rotational speed of the rotor 107 and the output shaft 106.

While being accommodated within the housing accommodation hole 14, a closed-bottomed cylindrical housing 72 is disposed such that it can reciprocate along the guide bars 63 and 64. In order to implement this guided movement, lugs a1, a2, b1, and b2 are integrally formed on the outer circumferential surface of the housing 72. The lugs a1 and a2 have respective through-holes formed therein in order to allow the guide bar 63 to extend through the same, and the lugs b1 and b2 have respective through-holes formed therein in order to allow the guide bar 64 to extend through the same. The housing 72 has a bearing portion 91 formed at the rear end, a spline portion 92 formed at the center, and a cut punch rod 93 formed at the front end. A cylindrical cut punch serving as a working member is disposed within the movable mold unit. The rear end of the cut punch is connected to the front end of the cut punch rod 93 through a hole 43 formed extending through the movable platen 11. Accordingly, the cut punch can be advanced and retracted through reciprocation of the housing 72.

In order to restrict axial movement of the housing 72 toward the servomotor 65, springs 130 and 131 serving as first movement restriction means are fitted onto the corresponding guide bars 63 and 64 so as to be located between the lugs a1 and b1 and the motor case 66.

In order to retreat the cut punch rod 93 and the ejector rod 97 from the movable mold unit, springs 136 and 137 serving as retreat means are fitted onto the corresponding guide bars 63 and 64 so as to be located between the lugs a2 and b2 and the movable platen 11, thereby imposing reaction forces of the springs 136 and 137 on the housing 72.

Two bearings 73 and 74 serving as support means are disposed inside the bearing portion 91. The bearings 73 and 74 support a cylindrical pulley 75 rotatably and receives a thrust load. The cylindrical pulley 75 includes a driven pulley 76 located at the rear end and a cylindrical portion 77 which extends forward from the pulley 76 while being integrated with the same. A ball nut 78 serving as a second transmission member is inserted into the cylindrical portion 77. The ball nut 73 has a flange portion 79 located at a frontward position.

In order to restrict axial movement of the ball nut 78 and fix the housing 72 at a predetermined position, brakes 133 and 134 are attached to the lugs a2 and b2 in such a manner that the brakes 133 and 134 surround the guide bars 63 and 64.

A stepped portion 90 is formed on the cylindrical portion 77 adjacent to the rear end of the bearing 73. The bearings 73 and 74 are held between the stepped portion 90 and the rear end of the flange portion 79 to thereby position the ball nut 78 with respect to the housing 72. Reference numeral 87 denotes a clamping member for positioning the bearings 73 and 74 with respect to the housing 72.

A cylindrical bearing housing 94 is disposed inside the spline portion 92 such that it can reciprocate. A spline 95 is formed on the outer circumferential surface of the bearing housing 94. A spline is formed on the inner wall of the spline portion 92 so as to be engaged with the spline 95. An ejector rod 97 is attached to the front end of the bearing housing 94 by means of a bracket 96. An ejector pin is disposed within the cut punch of the movable mold unit. The rear end of the ejector pin is connected to the front end of the ejector rod 97.

Two bearings 98 and 99 serving as support means are disposed inside the bearing housing 94. The bearings 98 and 99 support the ball screw shaft unit 112 rotatably and receives a thrust load. The spline portion 92 and the bearing housing 94 constitute first rotation restriction means for restricting relative rotation between the housing 72 and the bearing housing 94.

A servomotor 81, serving as second drive means, for driving the cut punch is attached to a bracket 82 formed integral with the housing 72. A timing belt 85 is looped around and extends between the driven pulley 76 and a drive pulley 84 attached to an output shaft 83 of the servomotor 81. The pulleys 76 and 84 and the timing belt 85 constitute rotation transmission means. Reference numeral 86 denotes a second encoder serving as a rotational-speed detector for detecting the rotational speed of the servomotor 81. An unillustrated controller controls the phase difference between outputs of the first and second encoders 110 and 86, thereby enabling simultaneous operation of the servomotors 65 and 81.

In order to advance the cut punch rod 93 when the ball nut 78 is rotated through operation of the servomotor 81, the ball screw shaft unit 112 is disposed such that it can reciprocate. The ball screw shaft unit 112 includes, from the rear end to the front end, a spline portion 113 having a spline formed on the outer circumferential surface thereof; a stopper 135 serving as third movement restriction means for restricting axial movement of the ball screw shaft unit 112 toward the servomotor 65; a ball screw shaft portion 114 having threads formed on the outer circumferential surface thereof; and a shaft portion 115 supported rotatably by the bearings 98 and 99. A clamp nut 116 is disposed on the front end of the shaft portion 115. Through tightening of the clamp nut 116, the bearings 98 and 99 can be positioned with respect to the housing 72. The present embodiment uses the stopper 135 serving as the third movement restriction means. However, a spring or brake to be fitted onto the spline portion 113 may replace the stopper 135.

A spline is formed on the inner wall of a spline nut 121 attached to the front end of the output shaft 106 so as to be engaged with the spline portion 113. Threads are formed on the inner wall of the ball nut 78 in order to establish screw engagement between the ball nut 78 and the ball screw shaft portion 114.

The ball nut 78 and the ball screw shaft unit 112 constitute motion conversion means for converting rotary motion of the ball nut 78 to linear motion of the ball screw shaft unit 112. The spline portion 113 and the spline nut 121 constitute second rotation restriction means for restricting relative rotation between the spline portion 113 and the spline nut 121.

Next, the operation of the thus-configured cut punch/ejector unit 62 will be described. The controller includes first drive control means for operating the servomotor 65 and second drive control means for operating the servomotor 81.

First, the second drive control means causes the servomotor 81 to rotate in the regular direction. Rotation in the regular direction is transmitted to the pulley 76 and the ball nut 78 via the output shaft 83, the pulley 84, and the timing belt 85. In this case, the first drive control means causes the servomotor 65 to keep a fixed rotational position (a fixed position in the direction of rotation), so that the ball screw shaft unit 112 does not rotate. Therefore, the ball nut 78 is caused to advance while rotating. Accordingly, the housing 72 is caused to advance, thereby causing the cut punch to advance, as represented by line L11 in FIG. 4. Thus, the cut punch punches a hole in the disc blank, thereby yielding a disc. Advancement of the housing 72 causes the springs 136 and 137 to be compressed. When a load associated with advancement of the cut punch is heavy, the ball screw shaft unit 112 may retreat while rotating. In such a case, the stopper 135 abuts the spline nut 121 as a result of retreat of the ball screw shaft unit 112, thereby preventing further retreat of the ball screw shaft unit 112. Thus, the ball nut 78 can be reliably caused to advance. At timing t11, the second drive control means causes the servomotor 81 to stop, thereby causing the ball nut 78 and the housing 72 to stop. As a result, the cut punch stops at the advance position of its stroke. The brakes 133 and 134 are operated to fix the housing 72 on the guide bars 63 and 64. During the above-mentioned operation of the cut punch, the servomotor 65 remains unoperated, so that the ball screw shaft unit 112 does not advance. Therefore, the ejector pin does not advance.

Subsequently, at timing t12, the first drive control means causes the servomotor 65 to rotate in the regular direction. Rotation in the regular direction is transmitted to the ball screw shaft unit 112 via the output shaft 106 and the spline nut 121. Rotation of the ball screw shaft unit 112 urges the ball nut 78 to rotate. However, the ball nut 78 remains unrotated, since the second drive control means causes the servomotor 81 to keep a fixed rotational position. Accordingly, the ball nut 78 and the ball screw shaft unit 112 are relatively rotated and relatively moved in the axial direction.

Advancement of the ball screw shaft unit 112 urges the ball nut 78 and the housing 72 to retreat. However, retreat of the ball nut 78 and the housing 72 is prevented, since the brakes 133 and 134 are operated to fix the housing 72 on the guide bars 63 and 64. Thus, the ball screw shaft unit 112 is caused to advance while rotating. Accordingly, the bearing housing 94, the bracket 96, and the ejector rod 97 are caused to advance, thereby causing the ejector pin to advance, as represented by line L12 in FIG. 4. Thus, the ejector pin knocks out the disc.

During the above-mentioned operation of the ejector pin, the cut punch remains at the advance position of its stroke, as represented by line L11 in FIG. 4, thereby preventing the knocked-out disc from dropping.

At timing t13, the first drive control means causes the servomotor 65 to stop, thereby causing the output shaft 106 and the spline nut 121 to stop. As a result, the ejector pin is caused to stop at the advance position of its stroke. Subsequently, when the brakes 133 and 134 are released, reaction forces of the springs 136 and 137 cause the housing 72 to retreat, thereby causing the cut punch rod 93 and the ejector rod 97 to retreat. At the same time, the first drive control means causes the servomotor 65 to rotate in the reverse direction. Rotation in the reverse direction is transmitted to the ball screw shaft unit 112 via the output shaft 106 and the spline nut 121, thereby causing the servomotor 65 to retreat. At this time, rotation of the ball screw shaft unit 112 urges the ball nut 78 to rotate. However, the ball nut 78 remains unrotated, since the second drive control means causes the servomotor 81 to keep a fixed rotational position. Accordingly, the ball nut 78 and the ball screw shaft unit 112 are relatively rotated and relatively moved in the axial direction.

If retreat of the ball screw shaft unit 112 urges the ball nut 78 and the housing 72 to advance, brake control means of the controller causes the brakes 133 and 134 to operate so as to fix the housing 72 on the guide bars 63 and 64. Accordingly, since advancement of the housing 72 is prevented, the ball screw shaft unit 112 is caused to retreat while rotating, thereby causing the bearing housing 94, the bracket 96, and the ejector rod 97 to retreat. Thus, the ejector pin is caused to retreat.

As described above, since the servomotor 81 is used to punch a hole in the disc blank, positional accuracy of the cut punch can be improved.

When the disc is knocked out from the mold through projection of the ejector pin, the cut punch can remain at the advance position of its stroke, thereby holding the knocked-out disc. In other words, the cut punch and the ejector pin can be operated concurrently. Thus, there is no need for delaying knock-out operation of the ejector pin in order to hold the disc by means of the cut punch, thereby shortening molding cycle time.

According to the present embodiment, rotation of the servomotor 81 is transmitted to the ball nut 78 via the pulley 84, the timing belt 85, and the pulley 76. However, the servomotor 81 and the ball nut 78 may be connected directly.

Also, the housing 72 may be equipped with a linear encoder so as to detect the position of the housing 72 for positional control.

Next, a second embodiment of the present invention will be described. Structural features similar to those of the first embodiment are denoted by common reference numerals, and repeated description thereof is omitted.

Figure 5:
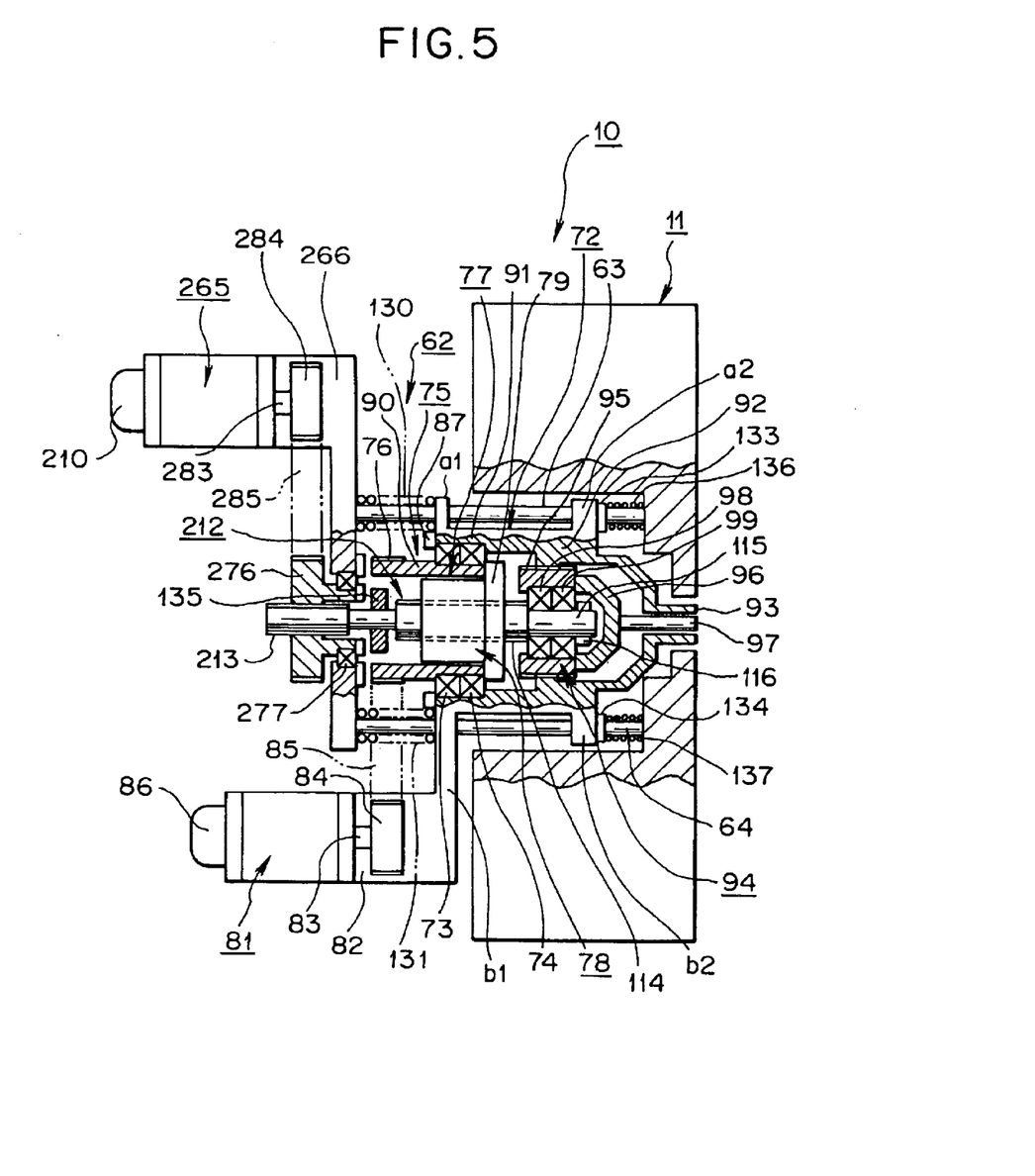
FIG. 5 is a sectional view showing a main portion of an injection molding machine according to a second embodiment of the present invention.

FIG. 5 is a sectional view showing a main portion of an injection molding machine according to a second embodiment of the present invention.

A motor support member 266 is attached to the rear ends (left-hand end in FIG. 5) of the two guide bars 63 and 64. A servomotor 265, serving as first drive means, for driving an ejector is attached to the motor support member 266. When the servomotor 265 is operated, a ball screw shaft unit 212 serving as a first transmission member is caused to rotate. A driven pulley 276 is rotatably supported by the motor support member 266 by means of a bearing 277. A timing belt 285 is looped around and extends between the driven pulley 276 and a drive pulley 284 attached to an output shaft 283 of the servomotor 265. Reference numeral 210 denotes a first encoder serving as a rotational-speed detector.

A servomotor 81, serving as second drive means, for driving a cut punch is attached to a bracket 82 formed integral with a housing 72. A timing belt 85 is looped around and extends between the driven pulley 76 and a drive pulley 84 attached to an output shaft 83 of the servomotor 81.

In order to cause a cut punch rod 93 to reciprocate (move rightward or leftward in FIG. 5) through operation of the servomotor 81 or in order to cause an ejector rod 97 to reciprocate through operation of the servomotor 265, a ball screw shaft unit 212 is disposed such that it can reciprocate. The ball screw shaft unit 212 includes, from the rear end to the front end (right-hand end in FIG. 5), a spline portion 213 having a spline formed on the outer circumferential surface thereof; a stopper 135 serving as third movement restriction means for restricting axial movement of the ball screw shaft unit 212; a ball screw shaft portion 114 having threads formed on the outer circumferential surface thereof; and a shaft portion 115 supported rotatably by bearings 98 and 99 serving as support means.

A spline is formed on the inner wall of the pulley 276 so as to be engaged with the spline portion 213. Threads are formed on the inner wall of the ball nut 78 serving as second transmission member in order to establish screw engagement between the ball nut 78 and the ball screw shaft portion 114. The spline portion 213 and the pulley 276 constitute second rotation restriction means for restricting relative rotation between the ball screw shaft unit 212 and the pulley 276.

Next, the operation of thus-configured cut punch/ejector unit 62 will be described. An unillustrated controller includes first drive control means for operating the servomotor 265 and second drive control means for operating the servomotor 81.

First, the second drive control means causes the servomotor 81 to rotate in the regular direction. Rotation in the regular direction is transmitted to the pulley 76 and the ball nut 78 via the output shaft 83, the pulley 84, and the timing belt 85. In this case, the first drive control means causes the servomotor 265 to keep a fixed rotational position, so that the ball screw shaft unit 212 does not rotate. Therefore, the ball nut 78 is caused to advance (move rightward in FIG. 5) while rotating. Accordingly, the housing 72 is caused to advance, thereby causing the cut punch serving as a working member to advance, as represented by line L11 in FIG. 4. Thus, the cut punch punches a hole in a disc blank, thereby yielding a disc. Advancement of the housing 72 causes springs 136 and 137 to be compressed. At timing t11, the second drive control means causes the servomotor 81 to stop, thereby causing the ball nut 78 and the housing 72 to stop. As a result, the cut punch stops at the advance position of its stroke. Brakes 133 and 134 are operated to fix the housing 72 on the guide bars 63 and 64.

Subsequently, at timing t12, the first drive control means causes the servomotor 265 to rotate in the regular direction. Rotation in the regular direction is transmitted to the ball screw shaft unit 212 via the output shaft 283, the pulley 284, the timing belt 285, and the pulley 276. Rotation of the ball screw shaft unit 212 urges the ball nut 78 to rotate. However, the ball nut 78 remains unrotated, since the second drive control means causes the servomotor 81 to keep a fixed rotational position. Accordingly, the ball nut 78 and the ball screw shaft unit 212 are relatively rotated and relatively moved in the axial direction.

Advancement of the ball screw shaft unit 212 urges the ball nut 78 and the housing 72 to retreat (move leftward in FIG. 5). However, retreat of the ball nut 78 and the housing 72 is prevented, since the brakes 133 and 134, serving as second movement restriction means, are operated to fix the housing 72 on the guide bars 63 and 64. Thus, the ball screw shaft unit 212 is caused to advance while rotating. Accordingly, the bearing housing 94, the bracket 96, and the ejector rod 97 are caused to advance, thereby causing an unillustrated ejector pin to advance, as represented by line L12 in FIG. 4. Thus, the ejector pin knocks out the disc.

During the above-mentioned operation of the ejector pin, the cut punch remains at the advance position of its stroke, as represented by line L11 in FIG. 4, thereby preventing the knocked-out disc from dropping.

At timing t13, the first drive control means causes the servomotor 265 to stop, thereby causing the ball screw shaft unit 212 to stop. As a result, the ejector pin is caused to stop at the advance position of its stroke. Subsequently, when the brakes 133 and 134 are released, reaction forces of the springs 136 and 137 cause the housing 72 to retreat, thereby causing the cut punch rod 93 and the ejector rod 97 to retreat. At the same time, the first drive control means causes the servomotor 265 to rotate in the reverse direction. Rotation in the reverse direction is transmitted to the ball screw shaft unit 212 via the pulley 284, the timing belt 285, and the pulley 276, thereby causing the ball screw shaft unit 212 to retreat. At this time, rotation of the ball screw shaft unit 212 urges the ball nut 78 to rotate. However, the ball nut 78 remains unrotated, since the second drive control means causes the servomotor 81 to keep a fixed rotational position. Accordingly, the ball nut 78 and the ball screw shaft unit 212 are relatively rotated and relatively moved in the axial direction.

If retreat of the ball screw shaft unit 212 urges the ball nut 78 and the housing 72 to advance, brake control means of the controller causes the brakes 133 and 134 to operate so as to fix the housing 72 on the guide bars 63 and 64. Accordingly, since advancement of the housing 72 is prevented, the ball screw shaft unit 212 is caused to retreat while rotating, thereby causing the bearing housing 94, the bracket 96, and the ejector rod 97 to retreat. Thus, the ejector pin is caused to retreat.

The above-described embodiments employ the servomotors 65, 265, and 81. However, ordinary motors equipped with a brake may be employed in place of the servomotors 65, 265, and 81. In this case, the first or second drive control means selectively causes the brake of the relevant motor to operate, thereby fixing the motor at a relevant rotational position.

The present invention is not limited to the above-described embodiments. Numerous modifications and variations of the present invention are possible in light of the spirit of the present invention, and they are not excluded from the scope of the present invention.

I claim:

1. A product ejecting apparatus for an injection molding machine, said apparatus comprising:
   a first drive unit;
   a second drive unit;
   a first transmission unit connected to said first drive unit, rotatably and reciprocatably disposed, wherein operating of said first drive unit results in a rotation of said first transmission unit and operating of said second drive unit results in a reciprocating movement of said first transmission unit;
   a second transmission unit rotatably and reciprocatably disposed, connected to said second drive unit, wherein operating of said second drive unit results in a rotation of said second transmission unit and operating of said first drive unit results in a reciprocating movement of said second transmission unit;
   an ejector pin configured to reciprocate based upon a motion of said first transmission unit; and
   a working member connected to said second transmission unit, wherein a movement of said second transmission unit results in reciprocating movement of said working member; wherein
   said first and second transmission units comprise a motion conversion unit which converts rotational motion of one of the transmission units to linear motion of the other transmission unit.

2. A product ejecting apparatus as recited in claim 1, wherein said first transmission unit and said first drive unit are configured such that a rotation of said first drive unit results in rotation and reciprocation of said first transmission unit.

3. A product ejecting apparatus as recited in claim 2, wherein said second transmission unit is configured such that a rotation of said second drive unit results in rotation and reciprocation of said second transmission unit.

4. A product ejecting apparatus as recited in claim 1, wherein a reciprocating movement of said ejector pin and a reciprocating movement of said working member are in a same direction.

5. A product ejecting apparatus as recited in claim 1, further comprising a movement restriction unit for restricting axial movement of the first transmission unit.

6. A product ejecting apparatus as recited in claim 5, wherein said movement restricting unit comprises a stopper.

7. A product ejecting apparatus as recited in claim 1, further comprising a movement restricting unit for restricting axial movement of said second transmission unit.

8. A product ejecting apparatus as recited in claim 7, wherein said movement restricting unit comprises brakes.

9. A product ejecting apparatus as recited in claim 7, wherein said movement restricting unit comprises at least one spring.

10. A product ejecting apparatus as recited in claim 1, further comprising:
    a first drive control unit for controlling said first drive unit; and
    a second drive control unit for controlling said second drive unit,
    wherein said first drive control unit and said second drive control unit are configured such that when said first drive control unit drives said first drive unit, said second drive unit is maintained in a fixed rotational position.

11. A product ejecting apparatus as recited in claim 10, wherein said first drive control unit and said second drive control unit are configured such that when said second drive control unit drives said second drive unit, said first drive unit is maintained in a fixed rotational position.

12. A product ejecting apparatus, said apparatus comprising:
    a first drive means for providing drive power for an injection molding machine;
    a second drive means for providing drive power;
    a first transmission means rotatably and reciprocatably disposed, wherein operating of said first drive means results in a rotation of said first transmission means and operating of said second drive means results in a reciprocating movement of said first transmission means, said first transmission means for transmitting power from said first drive means;
    a second transmission means rotatably and reciprocatably disposed, wherein operating of said second drive means results in a rotation of said second transmission means and operating of said first drive means results in a reciprocating movement of said second transmission unit;
    ejection means configured to reciprocate based upon a motion of said first transmission means; and
    a working member connected to said second transmission means, wherein movement of said second transmission means results in reciprocating movement of said working member; wherein
    said first and second transmission means comprise motion conversion means for converting motion of one of the transmission means to linear motion of the other transmission means.

13. A product ejecting apparatus as recited in claim 12, wherein said first transmission means and said first drive means are configured such that a rotation of said first drive means results in rotation and reciprocation of said first transmission means.

14. A product ejecting apparatus as recited in claim 13, wherein said second transmission means is configured such that a rotation of said second drive means results in rotation and reciprocation of said second transmission means.

15. A product ejecting apparatus as recited in claim 12, wherein a reciprocating movement of said ejection means and a reciprocating movement of said working member are in a same direction.

16. A product ejecting apparatus as recited in claim 12, further comprising movement restriction means for restricting axial movement of the first transmission means.

17. A product ejecting apparatus as recited in claim 16, wherein said movement restricting means comprises stopper means for stopping movement of said first transmission means.

18. A product ejecting apparatus as recited in claim 12, further comprising movement restricting means for restricting axial movement of said second transmission means.

19. A product ejecting apparatus as recited in claim 18, wherein said movement restricting means comprises brake means for restricting movement of said second transmission means.

20. A product ejecting apparatus as recited in claim 18, wherein said movement restricting means comprises spring means for restricting movement of said second transmission means.

21. A product ejecting apparatus as recited in claim 12, further comprising:
    first drive control means for controlling said first drive means; and second drive control means for controlling said second drive means, wherein said first drive control means and said second drive control means are configured such that when said first drive control means drives said first drive means, said second drive means is maintained in a fixed rotational position.

22. A product ejecting apparatus as recited in claim 21, wherein said first drive control means and said second drive control means are configured such that when said second drive control means drives said second drive means, said first drive means is maintained in a fixed rotational position.

* * * * *